United States Patent
Fan et al.

(10) Patent No.: US 9,880,937 B2
(45) Date of Patent: Jan. 30, 2018

(54) DYNAMIC SET ASSOCIATIVE CACHE APPARATUS FOR PROCESSOR AND ACCESS METHOD THEREOF

(71) Applicant: Huawei Technologies Co., Ltd., Shenzhen, Guangdong (CN)

(72) Inventors: Lingjun Fan, Shenzhen (CN); Shibin Tang, Shenzhen (CN); Da Wang, Shenzhen (CN); Hao Zhang, Shenzhen (CN); Dongrui Fan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 144 days.

(21) Appl. No.: 14/328,173

(22) Filed: Jul. 10, 2014

(65) Prior Publication Data
US 2014/0344522 A1 Nov. 20, 2014

Related U.S. Application Data (63) Continuation of application No. PCT/CN2013/075092, filed on May 2, 2013.

(30) Foreign Application Priority Data
May 2, 2012 (CN) .......................... 2012 1 0134204

(51) Int. Cl.
| | |
|---|---|
| G06F 12/08 | (2016.01) |
| G06F 1/32 | (2006.01) |
| G06F 12/0864 | (2016.01) |
| G06F 12/0895 | (2016.01) |

(Continued)

(52) U.S. Cl.
CPC ........ G06F 12/0864 (2013.01); G06F 1/3275 (2013.01); G06F 12/0833 (2013.01); G06F 12/0891 (2013.01); G06F 12/0895 (2013.01); *G06F 2212/601* (2013.01);
(Continued)

(58) Field of Classification Search
None
See application file for complete search history.

(56) References Cited

U.S. PATENT DOCUMENTS 5,860,110 A * 1/1999 Fukui .................. G06F 12/0813
711/141
6,041,396 A * 3/2000 Widigen ............. G06F 12/1036
711/163

(Continued)

FOREIGN PATENT DOCUMENTS

| CN | 1427341 A | 7/2003 |
| CN | 1819544 A | 8/2006 |

(Continued)

*Primary Examiner* — Mano Padmanabhan
*Assistant Examiner* — William E Baughman (57) ABSTRACT

The present invention provides a dynamic set associative cache apparatus for a processor. When read access occurs, the apparatus first determines a valid/invalid bit of each cache block in a cache set to be accessed, and sets, according to the valid/invalid bit of each cache block, an enable/disable bit of a cache way in which the cache block is located; then, reads valid cache blocks, compares a tag section in a memory address with a tag block in each cache block that is read, and if there is a hit, reads data from a data block in a hit cache block according to an offset section of the memory address.

8 Claims, 5 Drawing Sheets

(51) Int. Cl.
*G06F 12/0831* (2016.01)
*G06F 12/0891* (2016.01)

(52) U.S. Cl.
CPC .............. *G06F 2212/6032* (2013.04); *G06F 2212/621* (2013.01); *Y02B 60/1225* (2013.01); *Y02B 60/1228* (2013.01)

(56) References Cited

U.S. PATENT DOCUMENTS

| | | | |
|---|---|---|---|
| 6,185,657 B1 * | 2/2001 | Moyer | G06F 12/0848 |
| | | | 711/128 |
| 6,378,047 B1 | 4/2002 | Meyer | |
| 6,789,172 B2 * | 9/2004 | Chauvel | G06F 1/206 |
| | | | 710/22 |
| 2007/0043965 A1 | 2/2007 | Mandelblat et al. | |
| 2007/0274303 A1 | 11/2007 | Cui et al. | |
| 2009/0235029 A1 | 9/2009 | Mouton et al. | |
| 2010/0125750 A1 | 5/2010 | Moyer et al. | |
| 2010/0191990 A1 * | 7/2010 | Zhang | G06F 12/0864 |
| | | | 713/320 |
| 2014/0173210 A1 * | 6/2014 | O'Connor | G06F 12/0815 |
| | | | 711/128 |

FOREIGN PATENT DOCUMENTS

| | | |
|---|---|---|
| CN | 101533371 A | 9/2009 |
| CN | 102216904 A | 10/2011 |
| CN | 102306092 A | 1/2012 |
| CN | 102662868 A | 9/2012 |

* cited by examiner

DYNAMIC SET ASSOCIATIVE CACHE APPARATUS FOR PROCESSOR AND ACCESS METHOD THEREOF

CROSS-REFERENCE TO RELATED APPLICATIONS

This application is a continuation of International Application No. PCT/CN2013/075092, filed on May 2, 2013, which claims priority to Chinese Patent Application No. 201210134204.5, filed on May 2, 2012, both of which are hereby incorporated by reference in their entireties.

TECHNICAL FIELD

The present invention relates to a processor design, and in particular, to a cache design of a processor.

BACKGROUND

For a long time, a cache is applied in a structure of a processor, so as to relieve a problem of "storage wall" between the processor and a memory, that is, a processing speed of the processor is much greater than a data providing speed of the memory, so that the processor is generally in a "hungry" and waiting state. By using a locality principle of program access, including temporal locality, that is, a storage address being accessed is accessed again in a short period of time, and spatial locality, that is, a certain storage address is accessed, and an adjacent storage address is also accessed within a short period of time, the cache of the processor offsets the speed difference between the processor and the memory, thereby greatly improving performance of the processor. Generally speaking, for most programs, in a given processor structure, a larger cache apparatus always has higher program performance. Therefore, in recent years, the cache of the processor is made larger, and a multi-level cache structure including 2 levels and even 3 levels is also widely used. In a multi-core processor structure, a private cache (used only by a single processor core) and a shared cache (shared by multiple processor cores) are often configured.

However, power consumption of the cache apparatus is greater accordingly, and occupies an increasingly higher proportion in power consumption of a whole processor system, which even reaches 40%-50%. Power consumption is a problem that cannot be ignored in a current processor design field, and over-high power consumption may bring about various problems such as chip heat dissipation and stability problem. Therefore, reducing the power consumption of the cache serving as one of the most important components of the processor may effectively reduce total power consumption of the processor system. However, an existing method for reducing the power consumption of the cache needs support of software, or is at the cost of performance loss, or introduces excessive hardware overheads, thereby increasing complexity in implementation.

SUMMARY

Therefore, an objective of the present invention is to solve the foregoing technical problems, and provide a dynamic set associative cache apparatus for a processor, thereby lowering overall power consumption of the processor without reducing performance of the processor.

The objective of the present invention is implemented by using the following technical solutions:

According to one aspect, the present invention provides a dynamic set associative cache apparatus for a processor, and the apparatus includes:

a plurality of cache ways, where each cache way includes the same number of cache blocks, and each cache block includes a tag block and a data block; and a table unit recording a valid/invalid bit of the cache block, where the valid/invalid bit of the cache block is used to indicate whether the cache block is valid or invalid.

In the foregoing technical solution, the table unit is independent of an SRAM implementing a tag block array or a data block array. The table unit may be implemented by using a register file.

In the foregoing technical solution, when the processor performs read access on the apparatus, a valid/invalid bit of each cache block in a cache set to be accessed is obtained by checking the table unit, and an enable/disable bit of a cache way in which the cache block is located is set according to the valid/invalid bit of each cache block; then valid cache blocks in the cache set are read, and data is read from a data block in a valid cache block whose tag block matches a tag section in a memory address.

In the foregoing technical solution, for an invalid cache block, an enable/disable bit of a cache way in which the cache block is located is set to disabled; for a valid cache block, an enable/disable bit of a cache way in which the cache block is located is set to enabled.

According to another aspect, the present invention provides a method for performing read access on the apparatus in the foregoing technical solution, and the method includes:

(1) locating, according to an index section of a memory address, a cache set to be accessed;

(2) obtaining a valid/invalid bit of each cache block in the cache set by checking a table unit;

(3) setting, according to the valid/invalid bit of each cache block in the cache set, an enable/disable bit of a cache way in which the cache block is located; and (4) reading valid cache blocks in the cache set, and reading data from a data block in a valid cache block whose tag block matches a tag section in a memory address.

In the foregoing method, in the step (2), if it is checked that all cache blocks in the cache set to be accessed are invalid, a miss message may be directly sent.

In the foregoing method, in the step (3), for a cache block in an invalid state, an enable/disable bit of a cache way in which the cache block is located is set to disabled; for a cache block in a valid state, an enable/disable bit of a cache way in which the cache block locates is set to enabled.

In the foregoing method, the step (4) may include the following steps:

reading valid cache blocks in the cache set;

comparing the tag section in the memory address with a tag block in each cache block that is read; and if there is a hit, selecting, according to an offset section of the memory address, data from the data block in the corresponding cache block to perform write-back; and if there is not a hit, sending a miss message.

Compared with the prior art, the present invention has the following advantages:

degree of associativity of a cache apparatus is changed dynamically each time read access occurs, and a cache way in which an invalid cache block in a cache set is located is not enabled when a read operation occurs, thereby effectively reducing dynamic power consumption of the cache apparatus caused by the read operation during a read/write process. Therefore, power consumption of a processor cache is effectively reduced without substantially increasing design complexity and affecting processor performance.

BRIEF DESCRIPTION OF THE DRAWINGS

Embodiments of the present invention are further illustrated with reference to the accompanying drawings, where.

DETAILED DESCRIPTION

To make the objectives, technical solutions and advantages of the present invention more clearly, the present invention is further illustrated in detail by using specific embodiments with reference to the accompanying drawings. It should be understood that, the specific embodiments described herein are merely intended for explaining the present invention other than limiting the present invention.

Power consumption of a cache is divided into dynamic power consumption and static power consumption. The dynamic power consumption refers to capacitor charging/discharging power consumption and short circuit power consumption, which is mainly caused by circuit turnover when a read/write operation is performed on the cache. The static power consumption refers to leakage current power consumption, and is power consumption in a stable circuit state.

According to an analysis statistics taken on an SPEC (The Standard Performance Evaluation Corporation, the standard performance evaluation corporation) CPU2000 test program, about one third instructions in the program are access instructions or relate to access operations, and read operations are about the twice of write operations. In addition, when a write operation occurs, a corresponding cache block needs to be read first to see whether it is hit, and whether to perform a write operation is determined according to whether it is hit. Therefore, each write operation is accompanied with a read operation. It can be seen that, the read operation is the most important source of dynamic power consumption of a cache apparatus.

Figure 1:
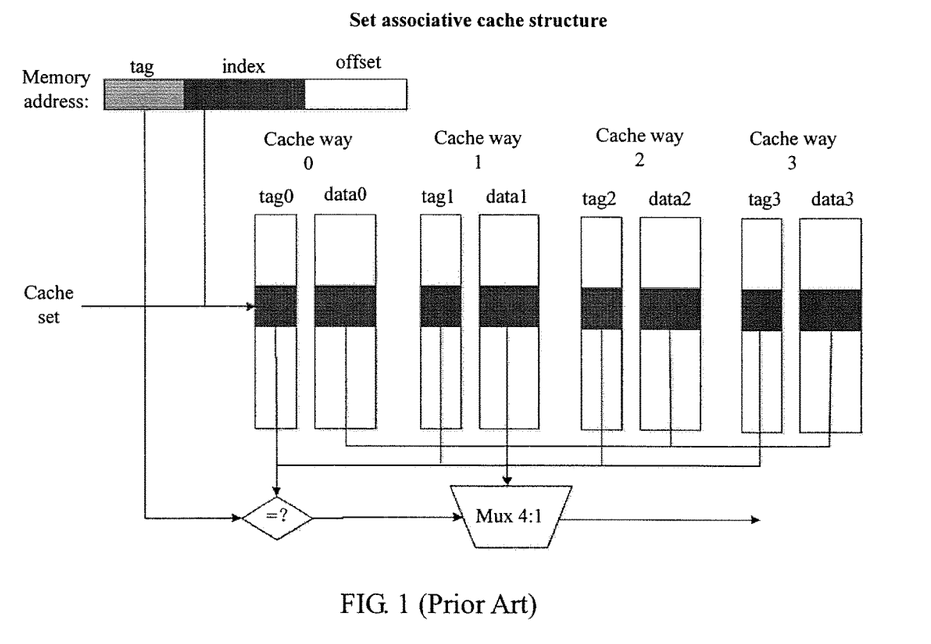
FIG. 1 is a schematic structural diagram of an example of an existing set associative cache apparatus.

An existing cache structure may be classified into three types: a directly associative cache, a fully associative cache, and a set associative cache. Compared with the directly associative cache, the set associative cache can effectively reduce conflict misses and improve a hit rate; compared with the fully associative cache, the set associative cache has less query time. Therefore, the set associative cache is widely used. FIG. 1 shows a schematic structural diagram of an existing set associative cache. FIG. 1 shows a 4-way set associative cache structure, which includes 4 cache ways: a cache way 0, a cache way 1, a cache way 2, and a cache way 3. Each cache way has the same number of cache blocks (for example, 128 blocks), and each cache block is formed by two parts: a tag (tag) section and a data (data) section (also referred to as a tag block and a data block). A memory address (32-bit address) is divided into a tag (tag) section, an index (index) section and an offset (offset) section. A cache set is formed by associating cache blocks having a same index in each cache way. In the 4-way set associative cache structure shown in FIG. 1, a cache set is formed by 4 cache blocks. As shown in the shaded part of FIG. 1, an associative set (set) formed by cache blocks having a same index of a $0^{th}$ path, $1^{st}$ path, $2^{nd}$ and $3^{rd}$ ways is the cache set. For example, a cache set is formed by associating tag0 and data 0 in the cache way 0, tag1 and data1 in the cache way 1, tag2 and data2 in the cache way 2, and tag3 and data3 in the cache way 3.

Figure 2:
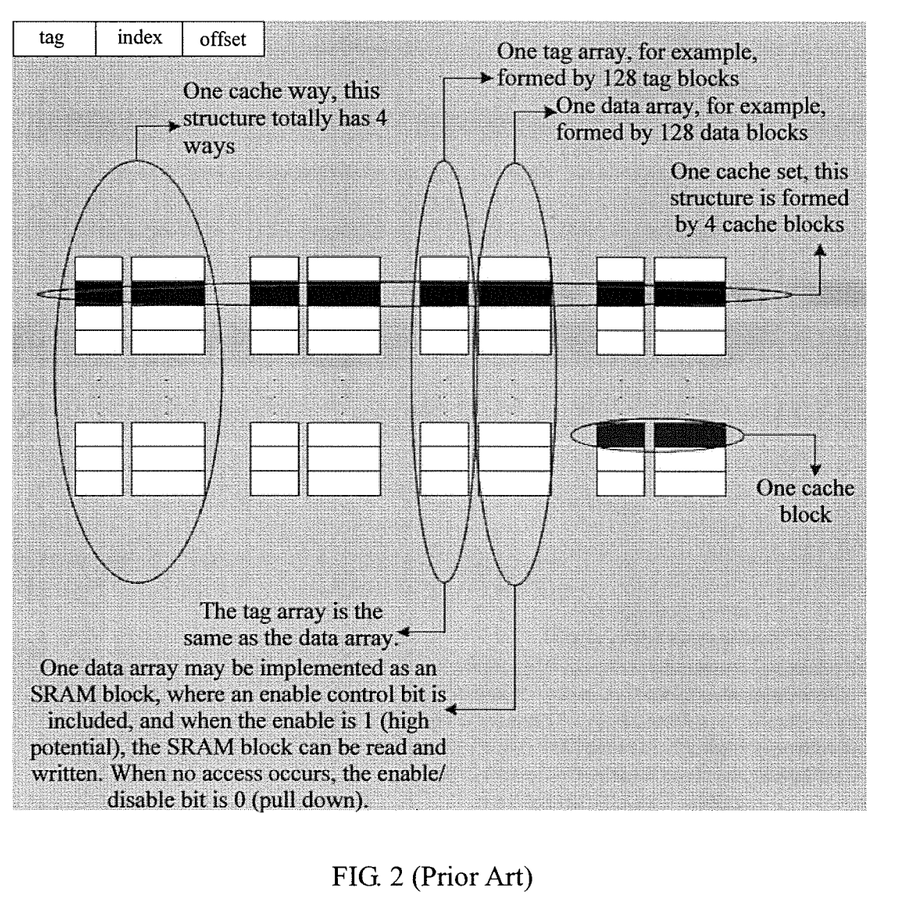
FIG. 2 is a schematic diagram of an access process of an existing set associative cache apparatus.

FIG. 2 shows a schematic diagram of an access process of the cache structure shown in FIG. 1. Access for an cache apparatus is performed by using a cache set as a unit, in other words, read access and write access both occur on a same cache set, that is, an operation is performed on each cache block having a same index in different cache ways. As shown in FIG. 2, each cache way includes a tag array (for example, may include 128 tag blocks) and a data array (for example, may include 128 data blocks). In a specific hardware implementation, the tag array or data array may be implemented as an SRAM block, where the SRAM block includes an enable control bit. When the enable/disable bit is 1 (high-level bit), a read/write operation may be performed on the SRAM block; and when no access occurs, the enable/disable bit is 0 (pulled down).

A conventional access procedure mainly includes the following steps:

a) after a memory address is generated, set enable/disable bits of all cache ways to up (pulling up potentials);

b) index, by means of an index section of the memory address, to a specific cache set (for example, if there are totally 128 cache sets, the index has 7 bits);

c) read each cache block (including a tag block and a data block) of the corresponding cache set and a valid flag bit (valid/invalid bit) of the cache block; and d) compare a tag section of the memory address with each tag block that is read, and check the valid flag bit (also briefly referred to as valid bit) of the cache block; if there is a hit (that is, tag matching) and the valid/invalid bit is valid, select data from a corresponding data block according to an offset field in the memory address to perform an operation, and if there is not a hit, send a miss message.

For example, when a read operation occurs, the index section of the memory address is used to index a cache set to be accessed, and the tag section of the memory address is used to be compared with the tag of each cache block in the cache set that is read. If there is a hit and the data of the cache block is valid, required data (for example, 8 bytes) is selected from a data block corresponding to the cache block according to the offset filed of the memory address, and the data is written back to a register.

In the access process, the cache set is a basic unit for indexing, and each time access occurs, all cache ways need to be accessed. In the cache structure shown in FIG. 1, the cache set is formed by cache blocks from 4 cache ways, and therefore, each time an access occurs, the number of cache ways that need to be accessed is 4, in other words, a degree of associativity of the cache structure is 4. The degree of associativity refers to the number of cache ways that need to be accessed each time an access occurs. A larger degree of associativity indicates that more cache blocks need to be read or more cache blocks need to be matched (for example, tag matching), and therefore, indicates larger power consumption.

Figure 3:
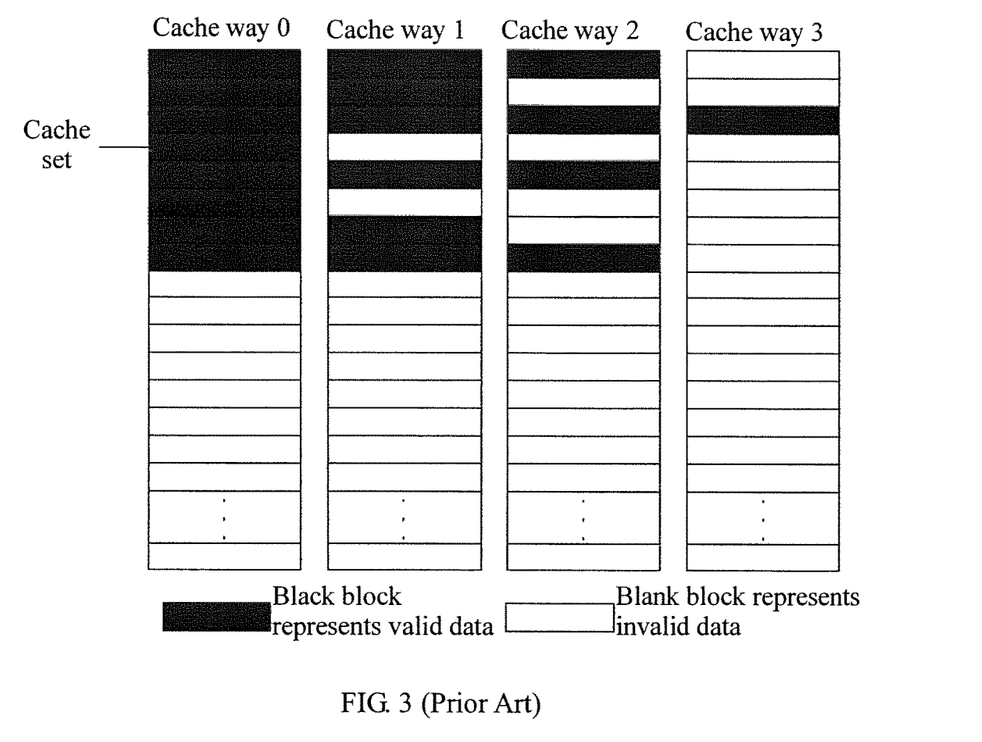
FIG. 3 is a schematic diagram of a state of a set associative cache apparatus during program execution.

However, in fact, each time a read operation occurs, data of each cache way in a cache set to be accessed is not always valid. FIG. 3 shows a schematic diagram of a state example of a set associative cache during program execution. As shown in FIG. 3, in each cache way, a black block indicates valid data, and a blank block indicates invalid data. For example, for a 4-way set associative cache structure, when read access occurs, in a cache set to be accessed, data of 4 paths is valid, data of 3 paths is valid, data of 2 paths is valid, data of only 1 path is valid, or even data of all paths is invalid. Reasons causing data invalidity in a cache block may be, for example: a) the cache block has not been initialized, but will be initialized soon; b) temporal locality and spatial locality of a program is good, and some cache blocks will not be initialized within a long period of time; c) the cache block has been filled, but data is made invalid. For example, an invalid (invalid) message that is sent by using a DMA (Direct Memory Access, direct memory access) operation in a single-core environment or sent by another processor in a multi-core environment will make data of a certain cache block valid.

By analyzing randomly selected SPEC CPU2000 test programs, the inventor finds that, in an execution process of a different program, about 30% to 70% read operations are read operations on invalid cache ways, thus resulting in a large amount of unnecessary dynamic power consumption.

Figure 4:
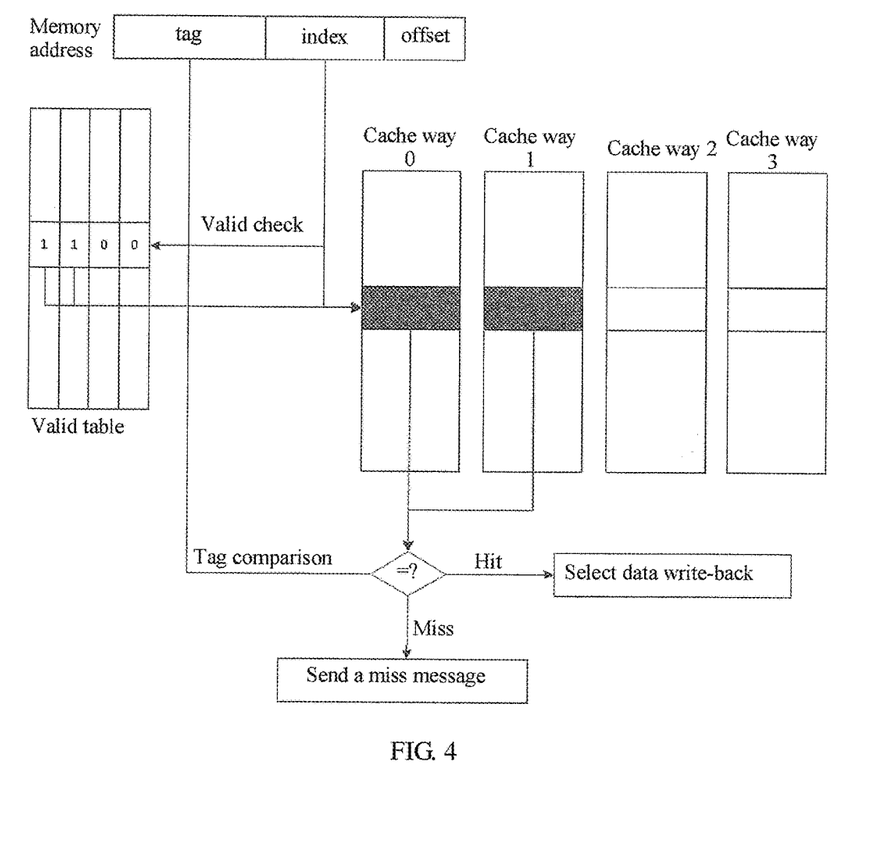
FIG. 4 is a schematic structural diagram of a dynamic set associative cache apparatus for a processor according to an embodiment of the present invention.

FIG. 4 is a schematic structural diagram of a dynamic set associative cache apparatus for a processor according to an embodiment of the present invention. A table unit (a valid table in FIG. 4) records a valid/invalid bit of a cache block, where the valid/invalid bit of the cache block is used to indicate whether the cache block is valid or invalid. When the cache block is filled with data for the first time, the corresponding valid flag bit (briefly referred to as a valid bit) of the cache block is set (for example, set to 1) in the valid table. When the cache block is not filled with data, the valid flag bit is invalid (for example, set to 0). The data in the cache block may also be written back to a memory by the processor and then set to invalid; or the data may also be set to invalid by an invalid message from another processor core or DMA. In this embodiment, the table unit (briefly referred to as the valid table) is implemented by using a register file, and is independent of an SRAM (static random access memory) for implementing a tag array (also referred to as a tag block array) or a data array (also referred to as a data block array). In other words, the table unit is not implemented together with the SRAM of the tag array or data array, or does not use the same SRAM as the tag array or data array.

As shown in FIG. 4, when read access occurs, the apparatus, after locating to a certain specific cache set by using an index section of a memory address, first checks a valid/invalid bit of each cache block in the cache set. For example, whether data of each cache block is valid is determined by checking the valid table shown in FIG. 4. Then, an enable/disable bit (enable/disable bit) of a cache way in which the cache block is located is set according to a determination result, and when it is found that a certain cache block is invalid (invalid), the enable/disable bit of a cache way in which the cache block is located is set to disable (disable) (that is, pull down the potential or set the enable/disable bit to 0); on the contrary, when the cache block is valid (valid), the enable/disable bit of a cache way in which the cache block is located is set to enable (enable) (that is, pull up the potential or set the enable/disable bit to 1).

The apparatus, when reading each cache block in the cache set, may only read a valid cache block, and compare a tag section of the memory address with a tag block that is read, and if there is a hit (that is, tag matching), perform selective (for example, 8 bytes thereof) write-back on the corresponding data block (for example, 32 bytes) according to an offset section in the memory address. If there is not a hit, a miss message is sent. In this manner, degree of associativity of the cache apparatus is changed dynamically each time read access occurs, and a cache way in which an invalid cache block is located is not enabled when a read operation occurs, thereby effectively reducing dynamic power consumption of the cache apparatus caused by the read operation during a read/write process.

Figure 5:
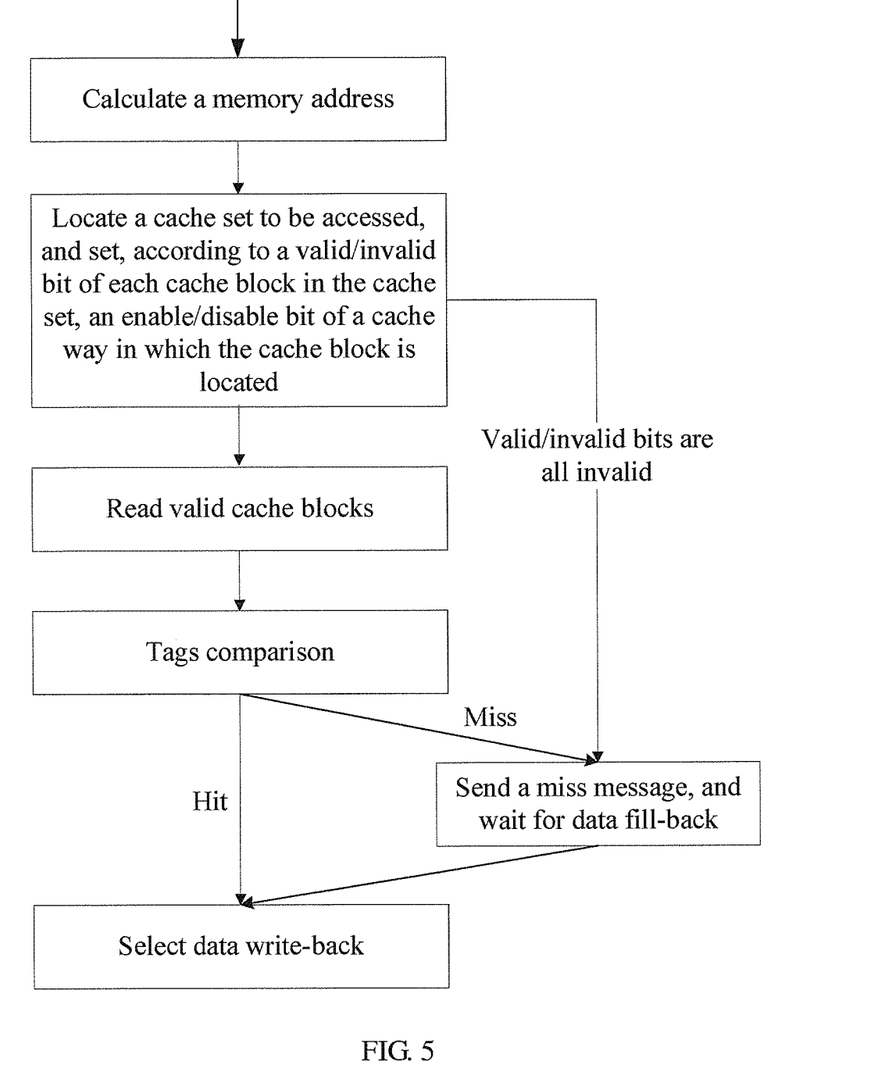
FIG. 5 is a schematic diagram of a read access procedure of a set associative cache apparatus according to an embodiment of the present invention.

FIG. 5 is a schematic diagram of a read access procedure of a dynamic set associative cache apparatus for a processor according to an embodiment of the present invention. The read access procedure mainly includes the following steps:

(1) after obtaining a memory address by means of calculation, locate a cache set to be accessed, according to an index section of the memory address;

(2) check a valid table for valid and invalid states of each cache block in the cache set to be accessed; and if it is found that valid/invalid bits of all cache blocks are invalid when checking the valid table, directly send a miss message;

(3) set, according to the valid/invalid bit of each cache block, an enable/disable bit of a cache way in which the cache block is located; for example, for a cache block in an invalid state, set an enable/disable bit of a cache way in which the cache block is located to disable, so as to shield access to the invalid cache block; for a cache block in a valid state, set an enable/disable bit of a cache way in which the cache block is located to enable.

(4) read a valid cache block (including a tag block and a data block) in the cache set; and (5) compare a tag section in the memory address with a tag block in each read cache block, and if there is a hit, select, according to an offset section of the memory address, data from the corresponding data block to perform write-back; if there is not a hit, send a miss message.

It can be seen that, in this embodiment of the present invention, when performing a read operation on the cache apparatus, an invalid cache block is checked in advance and a cache way in which the invalid cache block is located is made disabled (disable) during access, so as to reduce access to cache ways and reduce power consumption.

It should be pointed out that, the set associative cache apparatus in the foregoing embodiments is only used for exemplary illustration, instead of making limitation. In other words, the number of cache ways is not limited in the cache apparatus in the present invention, a set associative cache having a random number of paths is available, a size of a cache block therein is not specifically limited, and a size of the cache apparatus is not specifically limited either.

Although the present invention has been described by using exemplary embodiments, the present invention is not limited to the embodiments described herein, and also includes various modifications and variations made without departing from the scope of the present invention.

What is claimed is:

1. A dynamic set associative cache apparatus for performing read access, the apparatus comprising:
   a cache having multiple cache ways, each of the multiple cache ways including a plurality of cache blocks with various indexes, wherein each of the multiple cache ways provides a cache block with a same index to compose a cache set, such that the cache set includes multiple cache blocks with the same index, and wherein each of the cache ways has an enable/disable bit; and a processor coupled to the cache and configured to:
receive an access request including an index;
after identifying the cache set having the same index as the index included in the access request, determine whether a first cache block of cache blocks included in the cache set is invalid by checking a pre-set table, wherein the pre-set table includes a separate valid/invalid bit for each of the cache blocks for indicating whether each of the cache blocks is valid or invalid; and
when the first cache block is invalid, set an enable/disable bit of a first cache way in which the first cache block is located as disabled to make the first cache block inaccessible.

2. The apparatus according to claim 1, wherein the access request further includes a tag section, and wherein the processor is further configured to:
determine a second cache block of the cache blocks included in the cache set is valid by checking the pre-set table;
set an enable/disable bit of a second cache way in which the second cache block is located as enabled to make the second cache block accessible;
obtain the second cache block that includes a tag block and a data block;
compare the tag section in the access request with the tag block; and
obtain data from the data block when the tag section in the access request matches the tag block.

3. The apparatus according to claim 2, wherein a valid/invalid bit of the second cache block recorded in the pre-set table is valid when the second cache block is filled with data.

4. The apparatus according to claim 1, wherein the pre-set table includes a register file and is independent of a static random access memory (SRAM) implementing a tag array or a data array.

5. A method for performing read access on a set associative cache apparatus, the method comprising:
receiving, by a processor of the set associative cache apparatus, an access request including an index, wherein the set associative cache apparatus further includes a cache having multiple cache ways, wherein each of the multiple cache ways includes a plurality of cache blocks with various indexes, wherein each of the multiple cache ways provides a cache block with a same index to compose a cache set, such that the cache set includes multiple cache blocks with the same index, and wherein each of the cache ways has an enable/disable bit;
after identifying the cache set having the same index as the index included in the access request, determining, by the processor, whether a first cache block of cache blocks included in the cache set is invalid by checking a pre-set table, wherein the pre-set table includes a separate valid/invalid bit for each of the cache blocks for indicating whether each of the cache blocks is valid or invalid; and
when the first cache block is invalid, setting, by the processor, an enable/disable bit of a first cache way in which the first cache block is located as disabled to make the first cache block inaccessible.

6. The method according to claim 5, further comprising:
determining, by the processor, a second cache block of the cache blocks included in the cache set is valid by checking the pre-set table;
setting, by the processor, an enable/disable bit of a second cache way in which the second cache block is located as enabled to make the second cache block accessible;
obtaining, by the processor, the second cache block that includes a tag block and a data block;
comparing, by the processor, the tag section in the access request with the tag block; and
obtaining, by the processor, data from the data block when the tag section in the access request matches the tag block.

7. The method according to claim 6, wherein a valid/invalid bit of the second cache block recorded in the pre-set table is valid when the second cache block is filled with data.

8. The method according to claim 5, wherein the pre-set table includes a register file and is independent of a static random access memory (SRAM) implementing a tag array or a data array.

* * * * *